United States Patent
Nam

(12) 
(10) Patent No.: US 6,483,654 B2
(45) Date of Patent: *Nov. 19, 2002

(54) DISK DRIVE RECORDING APPARATUS HAVING ACTUATOR ARM WITH DUAL HEADS AND HEAD SWITCHING CONTROL METHOD

(75) Inventor: Hye-Jeong Nam, Kwangmyeong (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 09/948,760

(22) Filed: Sep. 10, 2001

(65) Prior Publication Data

US 2002/0012187 A1 Jan. 31, 2002

Related U.S. Application Data

(63) Continuation of application No. 08/599,875, filed on Feb. 12, 1996, now Pat. No. 6,317,282.

(30) Foreign Application Priority Data

May 10, 1995 (KR) .............................................. 7-11444

(51) Int. Cl.$^7$ ......................... G11B 15/12; G11B 21/02; G11B 5/596
(52) U.S. Cl. ............................. 360/61; 360/63; 360/75; 360/78.04
(58) Field of Search ............................. 360/61–63, 75, 360/78.04

(56) References Cited

U.S. PATENT DOCUMENTS

| | | |
|---|---|---|
| 2,680,239 A | 6/1954 | Daniels et al. ................ 360/63 |
| 4,800,455 A | 1/1989 | Takizawa .................. 360/234.7 |
| 4,937,693 A | 6/1990 | Connolly et al. ........ 360/246.8 |
| 4,998,238 A | 3/1991 | Mizunoe et al. ............. 369/116 |
| 5,218,496 A | 6/1993 | Kaczeus ..................... 360/266 |
| 5,343,345 A | 8/1994 | Gilovich .................. 360/264.7 |
| 5,343,347 A | 8/1994 | Gilovich .................. 360/246.7 |
| 5,465,244 A | 11/1995 | Kobayashi et al. ........ 369/47.4 |
| 5,519,676 A | 5/1996 | Kitahara .................. 369/47.27 |
| 6,317,282 B1 * | 11/2001 | Nam ........................... 360/61 |

* cited by examiner

*Primary Examiner*—Regina N. Holder
(74) *Attorney, Agent, or Firm*—Robert E. Bushnell, Esq.

(57) ABSTRACT

A disk drive recording apparatus includes an actuator arm with first and second heads extending from the actuator arm for writing and reading data to and from a first surface of a disk recording medium. The first and second heads are spaced apart from each other in a circumferential direction along the first surface of the disk recording medium. A switching device switches a data input/output path between the first head and the second head in response to a control signal. A microprocessor identifies a target position on the first surface of the disk recording medium and determines which one of the first and second heads is closer to the target position. The microprocessor then generates the control signal to switch the data input/output path to the first head when the first head is closer to the target position, and generates the control signal to switch the data input/output path to the second head when the second head is closer to the target position. The disk recording medium is preferably divided into three equally spaced intervals in the circumferential direction, and the first head is spaced apart from the second head by one of these intervals.

12 Claims, 3 Drawing Sheets

DISK DRIVE RECORDING APPARATUS HAVING ACTUATOR ARM WITH DUAL HEADS AND HEAD SWITCHING CONTROL METHOD

CROSS-REFERENCE TO RELATED APPLICATIONS

This application is a continuation application under 37 CFR 1.53(b) of Applicant's U.S. patent application Ser. No. 08/599,875, filed on Feb. 12, 1996 in the U.S. Patent & Trademark Office now U.S. Pat. No. 6,317,282, which in turn claims the priority date of Korean patent application No. 11444/1995 filed on May 10, 1995 in the Korean Industrial Property Office.

BACKGROUND OF THE INVENTION

The present invention relates to a disk drive recording apparatus, and more particularly, to a disk drive recording apparatus having an actuator arm with dual magnetic heads.

Generally, a disk drive recording apparatus, such as a hard disk drive (HDD) using a disk as a recording medium, includes one head gimbals assembly (HGA) connected to an actuator arm. The actuator arm is driven by a voice coil motor to enable a magnetic head to write and read servo information and data to and from a surface of the disk. In reading and writing data, the seek time required to access a target position on the disk is always a major concern.

One way to reduce seek times is to utilize an actuator arm that is bifurcated to support a pair of spaced transducing heads. This type of configuration has been previously disclosed in U.S Pat. No. 5,343,347 issued to Gilovich. While Gilovich '347 does recognize that the aforementioned configuration can be used to reduce seek times, the reference fails to disclose any specific details regarding how the configuration can be utilized to produce optimal results. Accordingly, the present invention has been contemplated to optimize the results achievable with this configuration.

SUMMARY OF THE INVENTION

Accordingly, it is an object of the present invention to provide an improved disk drive recording apparatus.

It is another object to provide a disk drive recording apparatus having an actuator arm with dual heads that optimizes performance results.

It is still another object to provide a disk drive recording apparatus capable of improving a seek time by utilizing two magnetic heads on a single surface of a disk.

It is yet another object to provide a head switching control method for seeking a target position on a disk surface by driving two magnetic heads on a single surface of a disk.

These and other objects can be achieved in accordance with the principles of the present invention a disk drive recording apparatus comprising an actuator arm with first and second heads extending from the actuator arm for writing and reading data to and from a first surface of a disk recording medium. The first and second heads are spaced apart from each other in a circumferential direction along a single radius of the first surface of the disk recording medium. A switching device switches a data input/output path between the first head and the second head in response to a control signal. A microprocessor identifies a target position on the first surface of the disk recording medium and determines which one of the first and second heads is closer to the target position. The microprocessor then generates the control signal to switch the data input/output path to the first head when the first head is closer to the target position, and generates the control signal to switch the data input/output path to the second head when the second head is closer to the target position. The disk recording medium is preferably divided into three equally spaced intervals in the circumferential direction, and the first head is spaced apart from the second head by one of these equally spaced intervals.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
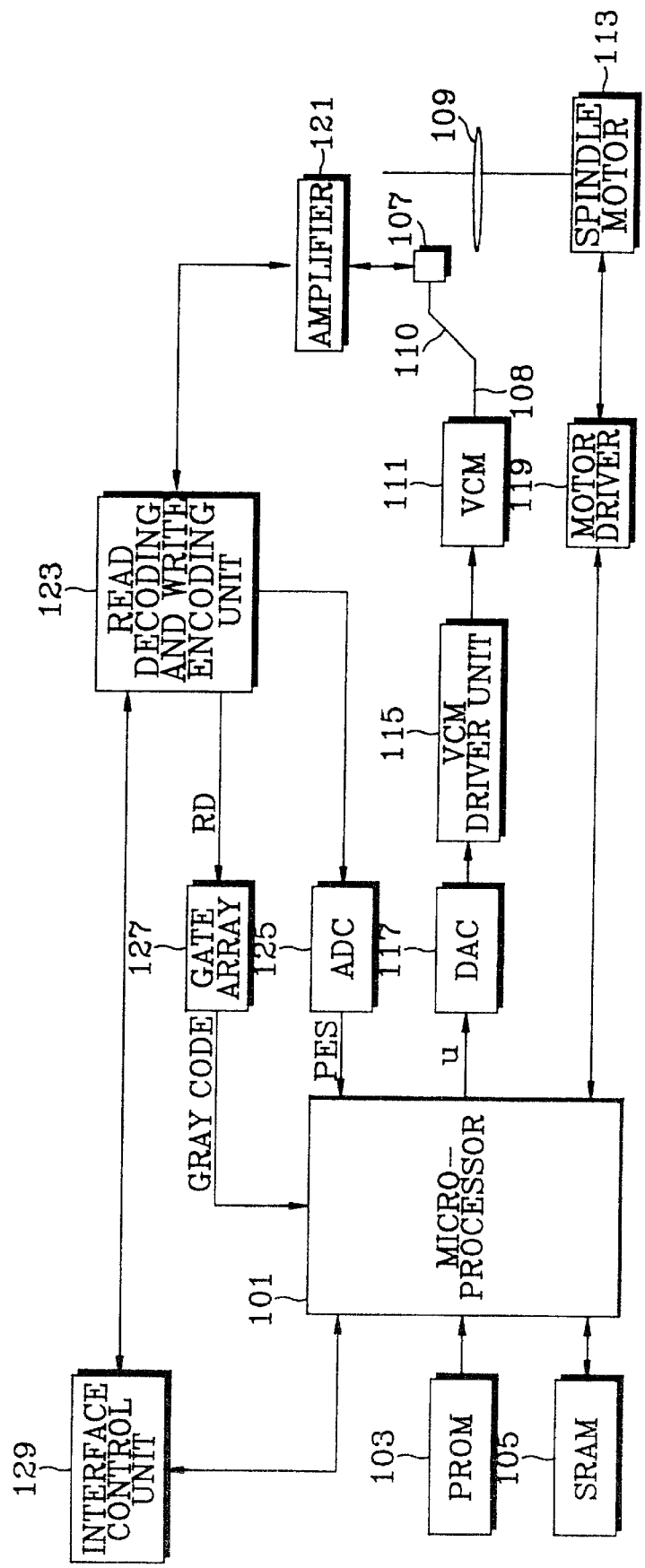
FIG. 1 is a block diagram illustrating the structure of a general disk drive recording apparatus.

Turning now to the drawings and referring to FIG. 1, the structure of a general disk drive recording apparatus is shown. In FIG. 1, a microprocessor 101 is connected to a static random access memory (SRAM) 105, and a programmable read only memory (PROM) 103 where a control program performed in microprocessor 101 is stored. A magnetic head 107 moves horizontally along the surface of a disk 109 in response to movement of an actuator arm 108 and a head gimbals assembly (HGA) 110, and writes and reads data to and from the surface of disk 109. A voice coil motor (VCM) 111 is connected to head 107 via actuator arm 108 and head gimbals assembly (HGA) 110, and enables movement of head 107 in the horizontal direction along the surface of disk 109. A spindle motor 113 rotates disk 109 about an axis of rotation. A voice coil motor (VCM) driver unit 115 is connected to voice coil motor (VCM) 111, and controls the driving of voice coil motor (VCM) 111. A digital-to-analog converter (DAC) 117 connected to microprocessor 101 and voice coil motor (VCM) driver unit 115 receives a digital control signal u from microprocessor 101, converts the digital control signal u into an analog signal, and then outputs the analog signal to voice coil motor (VCM) driving unit 115. A motor driver 119 is connected to spindle motor 113 and microprocessor 101, and controls the driving of spindle motor 113 by the control of microprocessor 101. An amplifier 121 connected to head 107 amplifies and outputs a read signal, and amplifies an input signal to be written on disk 109 via head 107. An interface control unit 129 is controlled by microprocessor 101 to transmit and receive data to and from an external data input device (not shown). A read decoding and write encoding unit 123 connected to amplifier 121 and interface control unit 129 receives write data from interface unit 129, and encodes the write data to produce an analog flux changing signal and thereby output an encoded signal to amplifier 121 by the control of microprocessor 101. Read decoding and write encoding unit 123 also converts an analog read signal received from amplifier 121 into a digital signal, and decodes encoded read data to thereby output read data (RD). An analog-to-digital converter (ADC) 125 connected to read decoding and write encoding unit 123 receives an analog servo read signal, and converts the analog servo read signal into a digital position error signal (PES) for output to microprocessor 101. A gate array 127 connected to read decoding and write encoding unit 123 receives read data (RD), detects servo information, such as a gray code, within a servo region of disk 109 from the read data (RD), and outputs detected servo information and a detection timing clock signal. In this structure, microprocessor 101 performs the overall control operation of the disk drive recording apparatus.

The disk drive recording apparatus mentioned above has a single head gimbals assembly (HGA) 110 on one actuator arm 108. That is, a single head 107 operates on one surface of disk 109. If a read or write command is provided from a host (e.g., a personal computer), the disk drive recording apparatus moves actuator arm 108 to a target position (i.e., track) on disk 109 to access data recorded on the target track. In this case, a time period of 20 milliseconds is commonly required to access the target track. The efficiency of a disk drive recording apparatus can be generally determined by an average seek time and a data transmission rate (i.e., the length of time required in reading and writing data). In particular, the seek time required to access a target position when reading and writing data is a more important element for determining the efficiency of the disk drive recording apparatus. Typically, the seek time is relatively longer than the data transmission time that occurs once head 109 is on-track. Accordingly, techniques for obtaining a high degree of overall efficiency for the disk drive recording apparatus by reducing the seek time have been continuously developed.

With a conventional disk drive recording apparatus, however, only one head is used for seeking a target position on the disk. Therefore, there is a problem in that a great amount of time is consumed when seeking the target position.

Figure 2:
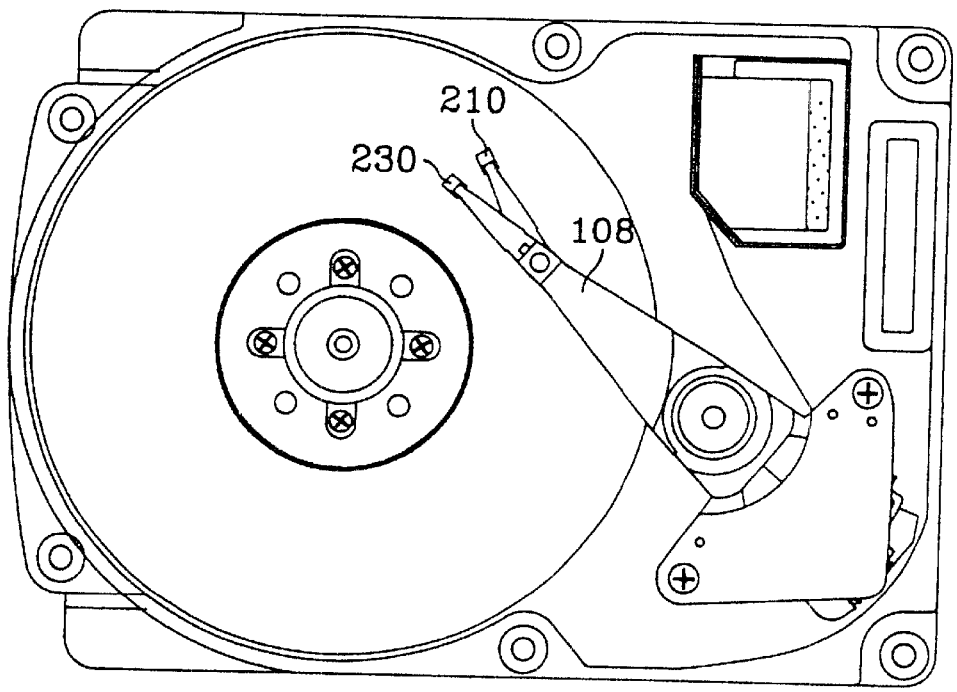
FIG. 2 is a view illustrating a disk drive recording apparatus having an actuator arm with dual magnetic heads in accordance with a preferred embodiment of the present invention.
Figure 3:
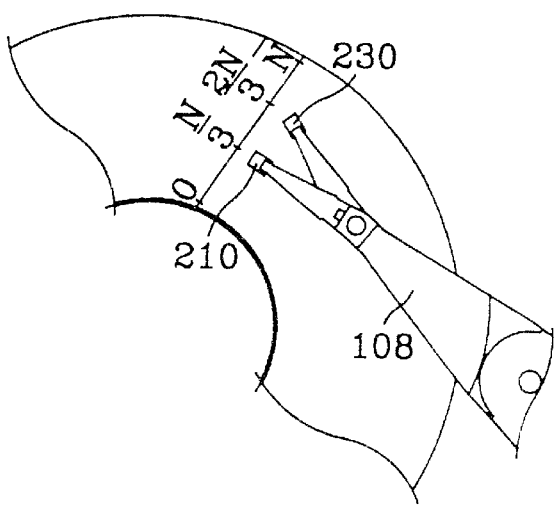
FIG. 3 is a view illustrating a data area on a disk in the disk drive recording apparatus constructed according to the preferred embodiment of the present invention.
Figure 4:
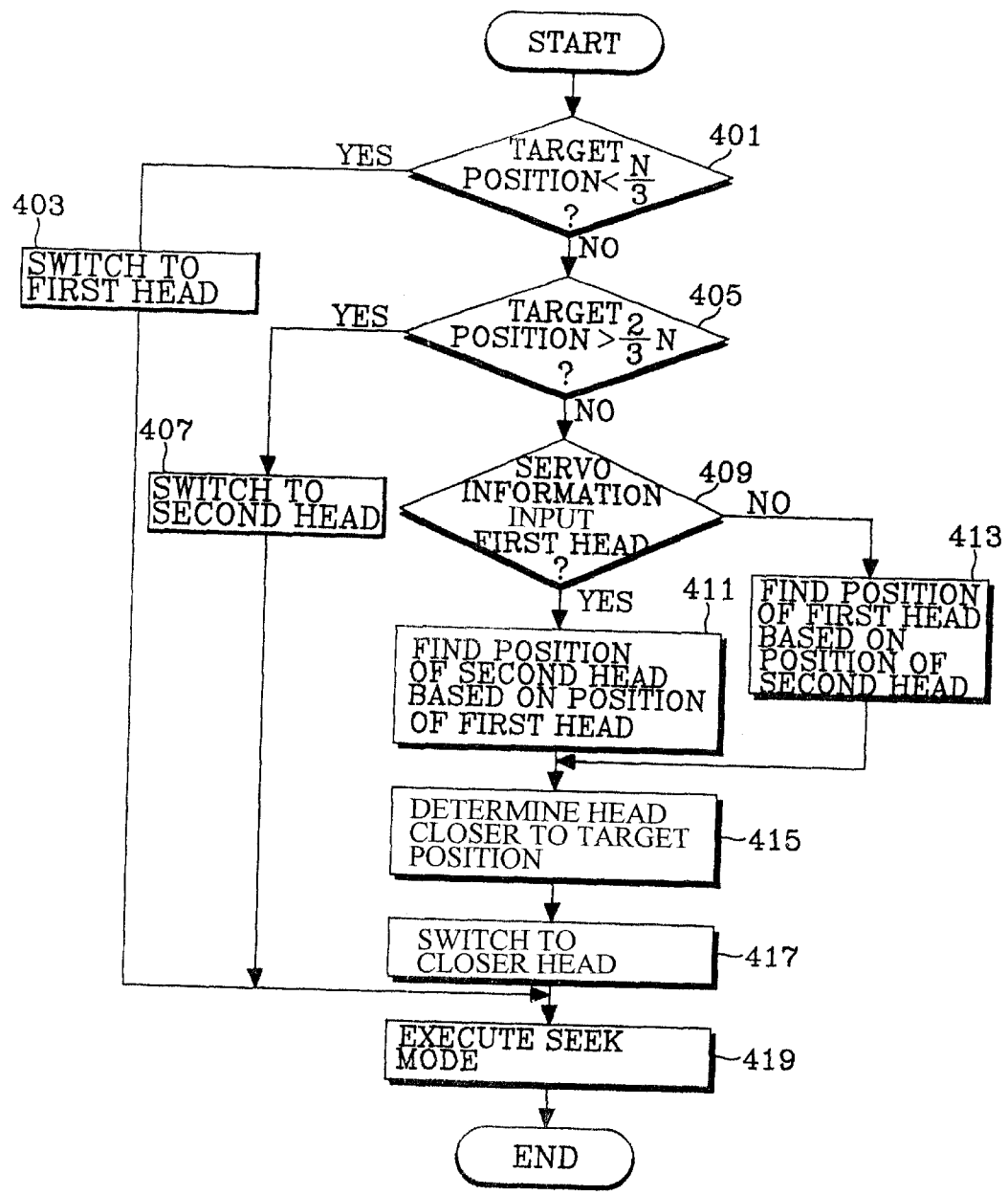
FIG. 4 is a flow chart illustrating the method for selecting a head for movement to a target position on a disk in the disk drive recording apparatus constructed according to the preferred embodiment of the present invention.

Turning now to FIGS. 2 through 4, operations of the disk drive recording apparatus constructed according to the principles of the present invention will be described. Note that the disk drive recording apparatus of the present invention can be embodied as the disk drive recording apparatus shown in FIG. 1, except that the present invention substitutes a first head 210 and a second head 230 shown in FIGS. 2 and 3 for the single head 107 shown in FIG. 1.

Referring to FIGS. 2 and 3, first head 210 and second head 230 are both positioned on a single disk surface. Assuming that the width of all the tracks on the disk is denoted by N, the two heads 210 and 230 are preferably spaced apart from each other by an interval of N/3. The input and output of data through first head 210 and second head 230 can be achieved through a switching device incorporated as a front 1 of read decoding and write encoding unit 123 of the disk drive recording apparatus shown in FIG. 1. This switching device would be controlled by microprocessor 101, and can be easily embodied by one of ordinary skill in the art.

Referring to FIG. 4, the head selection process in accordance with the preferred embodiment of the present invention will now be described. First, after microprocessor 101 has identified a target position (i.e., track), a determination is made, in step 401, as to whether the target position is within the interval between 0 and N/3 shown in FIG. 3. If the target position is between 0 and N/3, microprocessor 101 switches input/output lines to first head 210 in step 403. Alternatively, if the target position is not between 0 and N/3 in step 401, microprocessor 101 determines whether the target position is within the interval between 2N/3 and N in step 405. If the target position is between 2N/3 and N, microprocessor 101 switches input/output lines to second head 230 in step 407. Alternatively, if the target position is not between 2N/3 and N in step 405, microprocessor 101 detects whether servo information is input to first head 210 in step 409. At this time, if servo information is input to first head 210, microprocessor 101 finds the present position of second head 230 based on information representative of the present position of first head 210 in step 411. Since first head 210 and second head 230 are spaced apart from each other by a predetermined interval (i.e., N/3 in the preferred embodiment), the position of second head 230 can be obtained by simply adding the predetermined interval to the present position of first head 210.

On the other hand, if servo information is not input to first head 210 in step 409, microprocessor 101 receives present position information from second head 230 to thereby find the present position of first head 210 in step 413. After, microprocessor 101 compares the target position with the respective positions of first head 210 and second head 230 obtained in step 411 or step 413, a determination can be made as to which head is closer to the target position. Accordingly, microprocessor 101 switches the input/output path to the closer head in step 417, and then executes the seek mode to access the target position in step 419.

Accordingly, in the present invention, two heads are positioned on a single surface of a disk and the head that is closer to a target position is used. Therefore, there is an advantage in that the seek time of the disk drive recording apparatus is reduced.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A disk recording apparatus, comprising:
    an actuator arm;
    a plurality of n heads extending from said actuator arm to write and read data to and from a first surface of a disk recording medium that is divided into 2n−1 annular groups of tracks, said plurality of n heads being spaced apart from each other in a radial direction along a single substantially radial path extending outwardly between a center of said disk and a circumference of said disk;
    a switching circuit alternating a data input/output path between said plurality of n heads in response to a control signal; and
    a controller identifying a target position on said first surface of said disk recording medium, determining which of said plurality of n heads is closer to said target position, generating said control signal to switch said data input/output path to whichever said plurality of n heads is determined to be closer to said target position.

2. The disk drive recording apparatus as claimed in claim 1, further comprised of said disk recording medium being divided into a plurality of equally spaced intervals in said circumferential direction along said single radius, said first head being spaced apart from said second head by a single one of said plurality of equally spaced intervals.

3. A disk recording apparatus, comprising:

an actuator arm;

a plurality of n heads extending from said actuator arm to write and read data to and from a first surface of a disk recording medium that is divided into 2n−1 annular groups of tracks, said plurality of n heads being spaced apart from each other in a radial direction along a single substantially radial path extending outwardly between a center of said disk and a circumference of said disk with each pair of neighboring heads within said plurality of n heads being assigned to numerically odd numbered ones of said groups separated by intervening even numbered ones of said groups;

a switching circuit alternating a data input/output path between plurality of n heads in if response to a control signal; and a controller identifying a target position on said first surface of said disk recording medium within said even numbered ones of said groups, determining which of said plurality of n heads is closer to said target position, generating said control signal to switch said data input/output path to whichever of said plurality of n heads is determined to be closer to said target position.

4. The disk recording apparatus of claim 3, further comprised of said disk recording medium being divided into a plurality of equally spaced intervals in said circumferential direction along said single radius, said first head being spaced apart from said second head by a single one of said plurality of equally spaced intervals.

5. A disk recording apparatus, comprising:

an actuator arm;

a plurality of n heads extending from said actuator arm to write and read data to and from a first surface of a disk recording medium that is divided into 2n−1 annular groups of tracks, said plurality of n heads being spaced apart from each other in a radial direction along a single substantially radial path extending outwardly between a center of said disk and a circumference of said disk with each pair of neighboring heads within said plurality of n heads being assigned to numerically odd numbered ones of said groups separated by intervening even numbered ones of said groups;

a controller detecting current positions of said heads, determining which of said plurality of n heads is closer to a target position whenever said target position is located within said even numbered ones of said groups on said surface of said disk recording medium, and generating said control signal to switch said data input/output path to whichever of said plurality of n heads is determined to be closer to said target position; and a switching circuit directing an input/output path to which one of said plurality of n heads is assigned to one of said groups containing said target position whenever said target position is within one of said odd numbered ones of said groups, and alternating said data input/output path between said plurality of n heads in response to a control signal whenever said target position is within one of said even numbered ones of said groups.

6. The disk recording apparatus of claim 5, further comprised of said disk recording medium being divided into a plurality of equally spaced intervals in said circumferential direction along said single radius, said first head being spaced apart from said second head by a single one of said plurality of equally spaced intervals.

7. A method of switching between heads in a recording apparatus, comprising:

extending a plurality of n heads from an actuator arm to write and read data to and from a first surface of a disk recording medium that is divided into 2n−1 annular groups of tracks, with said plurality of n heads being spaced apart from each other in a radial direction along a single substantially radial path extending outwardly between a center of said disk and a circumference of said disk;

alternating a data input/output path between said plurality of n heads in response to a control signal;

identifying a target position on said first surface of said disk recording medium;

determining which of said plurality of n heads is closer to said target position; and generating said control signal to switch said data input/output path to whichever said plurality of n heads is determined to be closer to said target position.

8. The method of claim 7, further comprised of:

driving said disk recording medium into a plurality of equally spaced intervals in said circumferential direction along said single radius; and said first head spacing Apart from said second head by a single one of said plurality of equally spaced intervals.

9. A method of switching between heads in a recording apparatus, comprising:

extending a plurality of n heads from an actuator arm to write and read data to and from a first surface of a disk recording medium that is divided into 2n−1 annular groups of tracks, with said plurality of n heads being spaced apart from each other in a radial direction along a single substantially radial path extending outwardly between a center of said disk and a circumference of said disk, and with each pair of neighboring heads within said plurality of n heads being assigned to numerically odd numbered ones of said groups separated by intervening even numbered ones of said groups;

alternating a data input/output path between plurality of n heads in response to a control signal;

identifying a target position on said first surface of said disk recording medium within said even numbered ones of said groups;

determining which of said plurality of n heads is closer to said target position; and generating said control signal to switch said data input/output path to whichever of said plurality of n heads is determined to be closer to said target position.

10. The method of claims 9, further comprised of:

dividing said disk recording medium into a plurality of equally spaced intervals in said circumferential direction along said single radius; and spacing said first head apart from said second head by a single one of said plurality of equally spaced intervals.

11. A method of switching between heads in a recording apparatus, comprising:

extending a plurality of n heads from an actuator arm to write and read data to and from a first surface of a disk recording medium that is divided into 2n−1 annular groups of tracks, with said plurality of n heads being spaced apart from each other in a radial direction along a single substantially radial path extending outwardly between a center of said disk and a circumference of said disk, and with each pair of neighboring heads within said plurality of n heads being assigned to numerically odd numbered ones of said groups separated by intervening even numbered ones of said groups;

detecting current positions of said heads;

determining which of said plurality of n heads is closer to a target position whenever said target position is located within said even numbered ones of said groups on said surface of said disk recording medium;

generating said control signal to switch said data input/output path to whichever of said plurality of n heads is determined to be closer to said target position; and directing an input/output path to which one of said plurality of n heads is assigned to one of said groups containing said target position whenever said target position is within one of said odd numbered ones of said groups; and alternating said data input/output path between said plurality of n heads in response to a control signal whenever said target position is within one of said even numbered ones of said groups.

12. The method of claim 11, further comprised of:

dividing said disk recording medium into a plurality of equally spaced intervals in said circumferential direction along said single radius; and spacing said first head apart from said second head by a single one of said plurality of equally spaced intervals.

* * * * *